United States Patent
Pitt et al.

(10) Patent No.: US 9,446,836 B2
(45) Date of Patent: Sep. 20, 2016

(54) METHOD FOR A LEADING EDGE SLAT ON A WING OF AN AIRCRAFT

(71) Applicant: The Boeing Company, Chicago, IL (US)

(72) Inventors: Dale M. Pitt, Affton, MO (US); Nicholas Stephen Eckstein, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 579 days.

(21) Appl. No.: 13/955,126

(22) Filed: Jul. 31, 2013

(65) Prior Publication Data

US 2015/0102161 A1    Apr. 16, 2015

Related U.S. Application Data

(62) Division of application No. 12/505,061, filed on Jul. 17, 2009, now Pat. No. 8,534,610.

(51) Int. Cl.
| | |
|---|---|
| *B64C 3/50* | (2006.01) |
| *B64C 9/22* | (2006.01) |
| *B64C 9/24* | (2006.01) |
| *B64C 7/00* | (2006.01) |

(52) U.S. Cl.
CPC . *B64C 9/22* (2013.01); *B64C 7/00* (2013.01); *B64C 9/24* (2013.01)

(58) Field of Classification Search
None
See application file for complete search history.

(56) References Cited

U.S. PATENT DOCUMENTS

| | | | | |
|---|---|---|---|---|
| 2,541,565 A | * | 2/1951 | Ziegler | B64C 9/22 244/210 |
| 3,711,039 A | * | 1/1973 | James | B64C 9/22 244/214 |
| 4,171,787 A | * | 10/1979 | Zapel | B64C 3/48 244/214 |
| 4,252,287 A | * | 2/1981 | Zimmer | B64C 3/48 244/214 |
| 4,285,482 A | * | 8/1981 | Lewis | B64C 9/22 244/207 |
| 4,399,970 A | * | 8/1983 | Evans | B64C 9/24 244/214 |
| 4,650,140 A | * | 3/1987 | Cole | B64C 9/24 244/214 |
| 4,915,327 A | * | 4/1990 | Ellmers | B64C 13/30 244/210 |
| 5,094,411 A | * | 3/1992 | Rao | B64C 19/00 244/214 |

(Continued)

OTHER PUBLICATIONS

Pitt et al., "Method and Apparatus for a Leading Edge Slat on a Wing of an Aircraft," U.S. Appl. No. 12/505,061, filed Jul. 17, 2009, 38 pages.

(Continued)

*Primary Examiner* — Medhat Badawi
(74) *Attorney, Agent, or Firm* — Yee & Associates, P.C.

(57) ABSTRACT

A method for managing a flight control surface system. A leading edge device is moved on a leading edge from an undeployed position to a deployed position. The leading edge device has an outer surface, an inner surface, and a deformable fairing attached to the leading edge device such that the deformable fairing covers at least a portion of the inner surface. The deformable fairing changes from a deformed shape to an original shape when the leading edge device is moved to the deployed position. The leading edge device is then moved from the deployed position to the undeployed position, wherein the deformable fairing changes from the original shape to the deformed shape.

20 Claims, 8 Drawing Sheets

(56) References Cited

U.S. PATENT DOCUMENTS

| | | | | |
|---|---|---|---|---|
| 5,150,864 A * | 9/1992 | Roglin | ............... | B64C 3/44 244/17.25 |
| 5,222,653 A * | 6/1993 | Joyce | ............... | B64C 7/00 228/173.6 |
| 5,544,847 A * | 8/1996 | Bliesner | ............... | B64C 9/24 244/214 |
| 5,681,013 A * | 10/1997 | Rudolph | ............... | B64C 9/24 244/214 |
| 5,686,003 A * | 11/1997 | Ingram | ............... | B64D 15/12 219/201 |
| 5,839,699 A | 11/1998 | Bliesner | | |
| 5,927,656 A * | 7/1999 | Hinkleman | ............... | B64C 9/24 244/203 |
| 6,328,265 B1 | 12/2001 | Dizdarevic | | |
| 6,394,396 B2 * | 5/2002 | Gleine | ............... | B64C 3/46 244/1 N |
| 6,435,458 B1 | 8/2002 | Bliesner | | |
| 6,536,714 B2 | 3/2003 | Gleine et al. | | |
| 6,682,023 B2 * | 1/2004 | Broadbent | ............... | B64C 9/26 244/214 |
| 6,974,112 B2 | 12/2005 | Broadbent | | |
| 7,530,533 B2 | 5/2009 | Perez-Sanchez | | |
| 7,753,316 B2 | 7/2010 | Larssen et al. | | |
| 7,766,281 B2 | 8/2010 | Lorkowski et al. | | |
| 7,878,459 B2 | 2/2011 | Mabe et al. | | |
| 8,006,940 B2 | 8/2011 | Zeumer | | |
| 8,191,835 B2 | 6/2012 | Grohmann et al. | | |
| 8,256,719 B2 | 9/2012 | Wood et al. | | |
| 8,424,810 B1 * | 4/2013 | Shmilovich | ............... | B64C 9/22 244/214 |
| 8,476,564 B2 | 7/2013 | Henry et al. | | |
| 2006/0169847 A1 * | 8/2006 | Konings | ............... | B64C 3/50 244/214 |
| 2006/0237596 A1 | 10/2006 | Perez-Sanchez | | |
| 2007/0034747 A1 * | 2/2007 | Amorosi | ............... | B64C 13/24 244/215 |
| 2008/0265089 A1 | 10/2008 | Zeumer | | |
| 2009/0173834 A1 * | 7/2009 | Prince | ............... | B64C 23/06 244/198 |
| 2009/0212158 A1 | 8/2009 | Mabe et al. | | |
| 2010/0000991 A1 | 1/2010 | Henry et al. | | |
| 2010/0130065 A1 * | 5/2010 | Teague | ............... | B64C 9/22 439/640 |
| 2010/0133387 A1 | 6/2010 | Wood et al. | | |
| 2010/0219299 A1 * | 9/2010 | Holzhausen | ............... | B64C 9/22 244/214 |
| 2011/0006155 A1 * | 1/2011 | Kracke | ............... | B64C 9/02 244/99.3 |
| 2011/0011984 A1 * | 1/2011 | Voss | ............... | B64C 9/24 244/214 |
| 2011/0163204 A1 * | 7/2011 | Reckzeh | ............... | B64C 9/24 244/213 |
| 2011/0163205 A1 * | 7/2011 | Shepshelovich | ............... | B64C 3/14 244/219 |
| 2011/0248122 A1 * | 10/2011 | Schlipf | ............... | B64C 9/24 244/214 |
| 2011/0303792 A1 * | 12/2011 | Blanchard | ............... | B64C 9/22 244/131 |
| 2012/0097791 A1 * | 4/2012 | Turner | ............... | B64C 3/48 244/1 N |
| 2012/0187253 A1 * | 7/2012 | Dodd | ............... | B64C 3/50 244/214 |
| 2012/0292454 A1 * | 11/2012 | Schroeder | ............... | B64C 9/24 244/214 |
| 2014/0048656 A1 * | 2/2014 | Schlipf | ............... | B64C 9/02 244/214 |

OTHER PUBLICATIONS

Pitt et al., "Moveable Leading Edge Device for a Wing," U.S. Appl. No. 12/505,065, filed Jul. 17, 2009, 42 pages.

Robertson et al., "Texture in Tubes and Plates of the Superelastic/ Shape-Memory Alloy Nitinol", Proceedings of the Shape Memory and Superelastic Technologies Conference 2003 (SMST 2003), May 2003, 6 pages.

Office Action dated Jul. 16, 2012 regarding U.S. Appl. No. 12/505,065, 15 pages.

Final Office Action dated Nov. 21, 2012 regarding U.S. Appl. No. 12/505,065, 16 pages.

Office Action dated Dec. 20, 2012 regarding U.S. Appl. No. 12/505,061, 24 pages.

* cited by examiner

METHOD FOR A LEADING EDGE SLAT ON A WING OF AN AIRCRAFT

This application is a divisional of application Ser. No. 12/505,061, filed Jul. 17, 2009.

CROSS REFERENCE TO RELATED APPLICATION

The present disclosure is related to the following patent application: entitled "Moveable Leading Edge Device for a Wing", Ser. No. 12/505,065; filed Jul. 17, 2009, assigned to the same assignee, and incorporated herein by reference.

LICENSE RIGHTS

The invention described herein was made in the performance of work under NASA Contract No. NAS1-NNL04AA11B TASK NNL08AD73T and is subject to the provisions of Section 305 of the National Aeronautics and Space Act of 1958 (72 Stat.435: 42U.S.C.2457.).

BACKGROUND INFORMATION

1. Field

The present disclosure relates generally to aircraft and, in particular, to control surfaces for aircraft. Still more particularly, the present disclosure relates to a method and apparatus for a leading edge device on a wing of an aircraft.

2. Background

The wings of an aircraft are designed to generate lift as the aircraft moves. The configuration of a wing during flight at a cruising altitude may not provide sufficient lift at slower speeds when the aircraft is landing as control surfaces are used to change the configuration of an aircraft to provide lift augmentation.

Leading edge devices are commonly used to provide this additional lift. Leading edge devices are extensions of the front of a wing. These devices are used to reduce a stalling speed by altering the airflow over the wing.

An example of a leading edge device is a slat. Slats may be fixed or moveable. A retractable slat, as commonly used in commercial aircraft, provides for a reduced stalling speed at takeoff and landing. These slats are retracted for cruising to provide increased performance. An example of other control surfaces that are used to increase lift during takeoffs and landings are trailing devices, such as flaps.

With legislative controls on the amount of noise generated by aircraft, aircraft manufacturers and operators have developed and implemented quieter aircraft and better operating procedures. Aircraft manufacturers have focused on many different aspects of noise generated by an aircraft. For example, manufacturers have developed high-bypass turbo fan engines, which are quieter than the turbo jet engines and low-bypass turbo fans in previous aircraft models. Additionally, manufacturers have focused on other noise generation sources in an aircraft.

One currently available solution for reducing noise involves using a leading edge flap, which provides reduced noise as compared to a slat that extends. This device, however, reduces the amount of lift that can be generated as compared to using extendable slats.

Therefore, it would be advantageous to have a method and apparatus that takes into account one or more of the issues discussed above.

SUMMARY

In one advantageous embodiment, an apparatus comprises a leading edge device having an outer surface and an inner surface and a deformable fairing attached to the leading edge device such that the deformable fairing covers at least a portion of the inner surface. The deformable fairing has an original shape when the leading edge device is in a deployed position and a deformed shape when the leading edge device is in an undeployed position.

In another advantageous embodiment, a flight control surface system comprises a slat having an outer surface and an inner surface, a deformable fairing attached to the slat such that the deformable fairing covers at least a portion of the inner surface, a wing having a leading edge, and an actuator system. The deformable fairing is comprised of a shape memory alloy. The deformable fairing has an original shape when the slat is in a deployed position and a deformed shape when the slat is in an undeployed position. The slat is moveably attached to the leading edge of the wing. The actuator system is configured to move the slat between the deployed position and the undeployed position.

In yet another advantageous embodiment, a method is present for managing a flight control surface system. A leading edge device is moved on a leading edge from an undeployed position to a deployed position. The leading edge device has an outer surface, an inner surface, and a deformable fairing attached to the leading edge device such that the deformable fairing covers at least a portion of the inner surface. The deformable fairing changes from a deformed shape to an original shape when the leading edge device is moved to the deployed position. The leading edge device is then moved from the deployed position to the undeployed position, wherein the deformable fairing changes from the original shape to the deformed shape.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
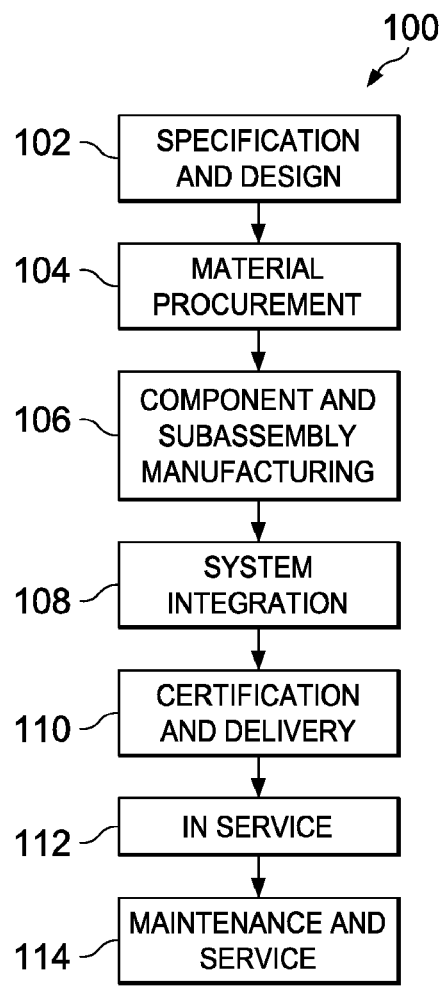
FIG. 1 is a diagram illustrating an aircraft manufacturing and service method in accordance with an advantageous embodiment.
Figure 2:
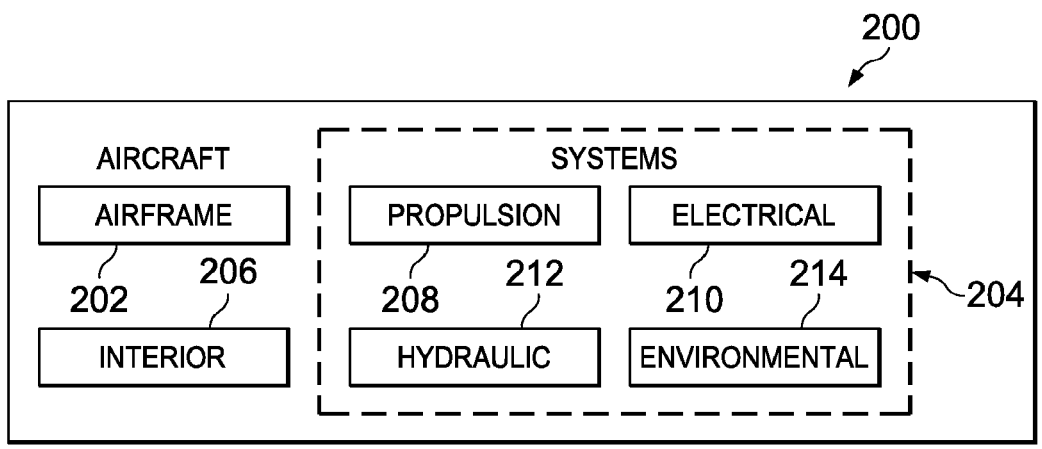
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in, for example, without limitation, component and subassembly manufacturing 106, system integration 108, and/or during maintenance and service 114 in FIG. 1.

For example, one or more of the different advantageous embodiments may be used to replace currently used flaps on aircraft 200 with those in accordance with one or more advantageous embodiments. The use of a number of the different advantageous embodiments may substantially expedite the assembly of or reduce the cost of aircraft 200. Further, the different advantageous embodiments also may reduce the noise that may be generated by aircraft 200 while aircraft 200 is in service 112.

The different advantageous embodiments recognize and take into account a number of different considerations. For example, the different advantageous embodiments recognize and take into account that noise generated by a leading edge device is not just caused by the gap between the leading edge device and the wing when the leading edge device is extended but also by the shape of the leading edge device.

The different advantageous embodiments recognize and take into account that the inner surfaces or coves of leading edge devices, such as slats, have strong vortex recirculation regions. In other words, the air may circulate in a circular vortex-type shape. This circulation may increase the amount of noise created when the slat is extended during landings and takeoffs. The different advantageous embodiments recognize and take into account that this noise may be reduced by changing the design of a slat to reduce or eliminate this air recirculation on the inner surface of the slat.

Thus, one or more of the advantageous embodiments provide a method and apparatus for a leading edge device. The apparatus comprises a leading edge device having an outer surface and an inner surface. A deformable fairing is attached to the leading edge device such that the deformable fairing covers at least a portion of the inner surface. The deformable fairing has an original shape when the leading edge device is in a deployed position and a deformed shape when the leading edge device is in an undeployed position. The deformable fairing may reduce undesirable airflow that may occur if the inner surface is not at least partially covered by the deformable fairing.

Figure 3:
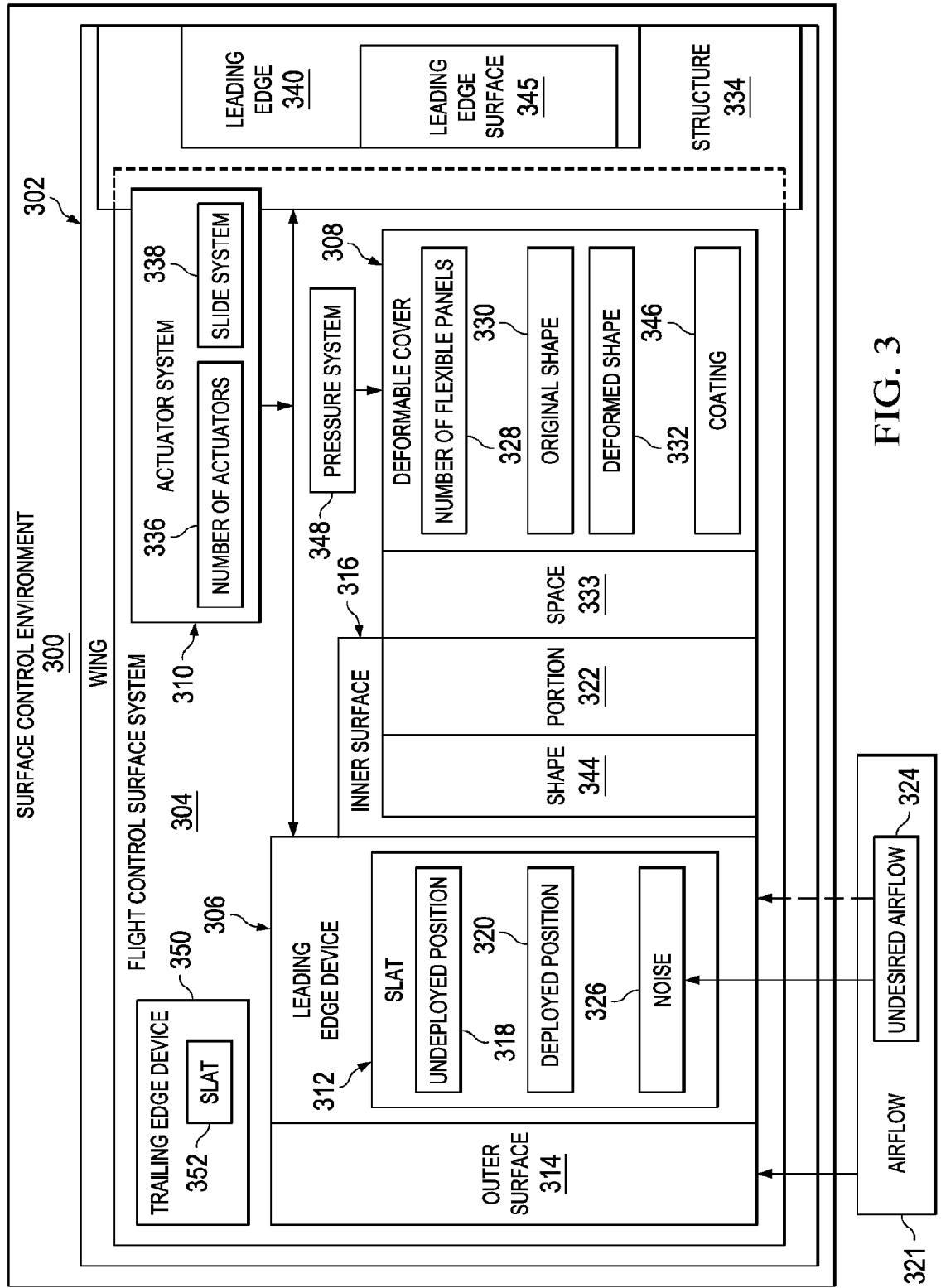
FIG. 3 is a diagram of a surface control environment in accordance with an advantageous embodiment.

With reference now to FIG. 3, a diagram of a surface control environment is depicted in accordance with an advantageous embodiment. Surface control environment 300 in FIG. 3 may be implemented in an aircraft, such as aircraft 200 in FIG. 2. In this illustrative example, wing 302 has flight control surface system 304. Flight control surface system 304 comprises leading edge device 306, deformable fairing 308, actuator system 310, and/or other suitable components. In this illustrative example, leading edge device 306 takes the form of slat 312.

Leading edge device 306 may have outer surface 314 and inner surface 316. In these examples, leading edge device 306 may have undeployed position 318 and deployed position 320. In undeployed position 318, outer surface 314 may be exposed to airflow 321, and inner surface 316 may be unexposed to airflow 321. When leading edge device 306 is moved into deployed position 320, inner surface 316 would be exposed to airflow 321 without deformable fairing 308.

Deformable fairing 308 covers at least portion 322 of inner surface 316 in a manner that reduces and/or eliminates undesired airflow 324 over leading edge device 306. By reducing or eliminating undesired airflow 324, noise 326, which may be generated by undesired airflow 324, also may be reduced.

In these illustrative examples, deformable fairing 308 may be formed from number of flexible panels 328. For example, a number of flexible panels is one or more flexible panels. Number of flexible panels 328 in deformable fairing 308 may be configured to give deformable fairing 308 original shape 330 and/or deformed shape 332.

Deformable fairing 308 is associated with leading edge device 306. A first component may be considered to be associated with a second component by being secured to the second component, bonded to the second component, fastened to the second component, and/or connected to the second component in some other suitable manner. The first component also may be considered to be associated with the second component by being formed as part of and/or an extension of the second component.

Deformable fairing 308 has original shape 330 when leading edge device 306 is in deployed position 320. When leading edge device 306 is in deployed position 320 and deformable fairing 308 has original shape 330, space 333 may be present between deformable fairing 308 and inner surface 316. Deformable fairing 308 changes to deformed shape 332 when leading edge device 306 is moved against structure 334 in wing 302 by actuator system 310.

Actuator system 310 comprises number of actuators 336 and slide system 338. Number of actuators 336 may provide the force to move leading edge device 306. Number of actuators 336 may be, for example, a number of linear actuators. Slide system 338 is configured to guide leading edge device 306 during movement between undeployed position 318 and deployed position 320. For example, without limitation, slide system 338 may comprise a number of rails that move along rollers. In this manner, these and/or other suitable components within actuator system 310 are configured to move leading edge device 306 between deployed position 320 and undeployed position 318.

In these illustrative examples, actuator system 310 may be implemented using currently available actuator systems for moving slats. In these illustrative examples, the same actuator system used to move slats may be used with leading edge device 306 in these examples. For example, a slat may be removed, and leading edge device 306 may be put in place of the slat.

In these illustrative examples, structure 334 contacts deformable fairing 308. As leading edge device 306 moves into undeployed position 318, force is exerted on deformable fairing 308 by structure 334 causing deformable fairing 308 to take deformed shape 332. In this illustrative example, structure 334 may be leading edge 340 of wing 302. Leading edge device 306 may move in a manner to become adjacent to or integrate into leading edge 340 of wing 302 when moved into undeployed position 318.

In these illustrative examples, number of flexible panels 328 may be comprised of materials selected from at least one of a shape memory alloy, a nickel-titanium alloy, nitinol, aluminum, titanium, steel, a plastic, a synthetic composite, a polyurethane, a metal, a metal alloy, and/or other suitable materials. Further, number of flexible panels 328 may have a shape or pattern designed to cover at least portion 322 of inner surface 316. When a shape memory alloy is used, the shape memory alloy may be selected as one that has what are commonly referred to as super elastic characteristics.

For example, a shape memory alloy may be selected that has a capability to retain or substantially retain an original shape from a deformed state when the mechanical load that causes the deformation is withdrawn. In some shape memory alloys, the recoverable strains may be on the order of around eight percent to around 10 percent. This type of recoverable strain is an example of one characteristic that may be used to identify a shape memory alloy as being super elastic.

Of course, other materials may be used other than shape memory alloys. When other materials are used, these materials may be, for example, selected as ones having an adequate yield strain level. For example, without limitation, number of flexible panels 328 may be aluminum alloys, titanium alloys, and other suitable materials.

In this illustrative example, inner surface 316 has shape 344, which may be configured to be received by structure 334. Deformable fairing 308 may substantially conform to shape 344 when leading edge device 306 is moved into undeployed position 318. Shape 344 may be curved or referred to as a cove to abut or move against structure 334. Also, in some advantageous embodiments, deformable fairing 308 also may include coating 346.

Coating 346 may be a coating used to reduce friction that may occur when deformable fairing 308 is pushed against leading edge surface 345 of structure 334. In these illustrative examples, coating 346 may be, for example, a layer of Teflon® and/or any other suitable material that may reduce rubbing or friction. In the illustrative examples, structure 334 may be referred to as the leading edge of a main wing section.

In the different advantageous embodiments, flight control surface system 304 may be installed during the manufacturing and assembly of new aircraft. Further, flight control surface system 304 may be installed during maintenance or refurbishment of aircraft. For example, leading edge device 306 may be used to replace currently existing slats. This replacement may occur without a need to change other structures in flight control surface system 304. For example, the current actuator system, track system, and/or other components may be used with few or no modifications.

The illustration of surface control environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, pressure system 348 may be used with deformable fairing 308. Pressure system 348 may be configured to change deformable fairing 308 between original shape 330 and deformed shape 332. For example, pressure system 348 may take the form of a spring system, an air pressure system, and/or some other suitable type of pressure system.

As a specific example, when deformable fairing 308 is comprised of a material that is not a shape memory alloy, pressure system 338 may take the form of a spring system. As a spring system, pressure system 338 allows deformable fairing to move between original shape 330 and deformed shape 332. Further, in some advantageous embodiments, pressure system 348 may take the form of an air pressure system that changes deformable fairing 308 to original shape 330 at a pressure higher than the pressure at which deformable fairing 308 changes to deformed shape 332.

In yet other advantageous embodiments, an additional number of leading edge devices with deformable fairings may be used in addition to leading edge device 306 in deformable fairing 308. Although the different advantageous embodiments have been shown with respect to a leading edge device, other advantageous embodiments may be applied to a trailing edge device. As another example, although flight control surface system 304 is described with respect to leading edge device 306, the different advantageous embodiments may be applied to other types of edge devices. For example, the different advantageous embodiments may be applied to trailing edge device 350. More specifically, as an illustrative example, trailing edge device 350 may take the form of slat 352.

Figure 4:
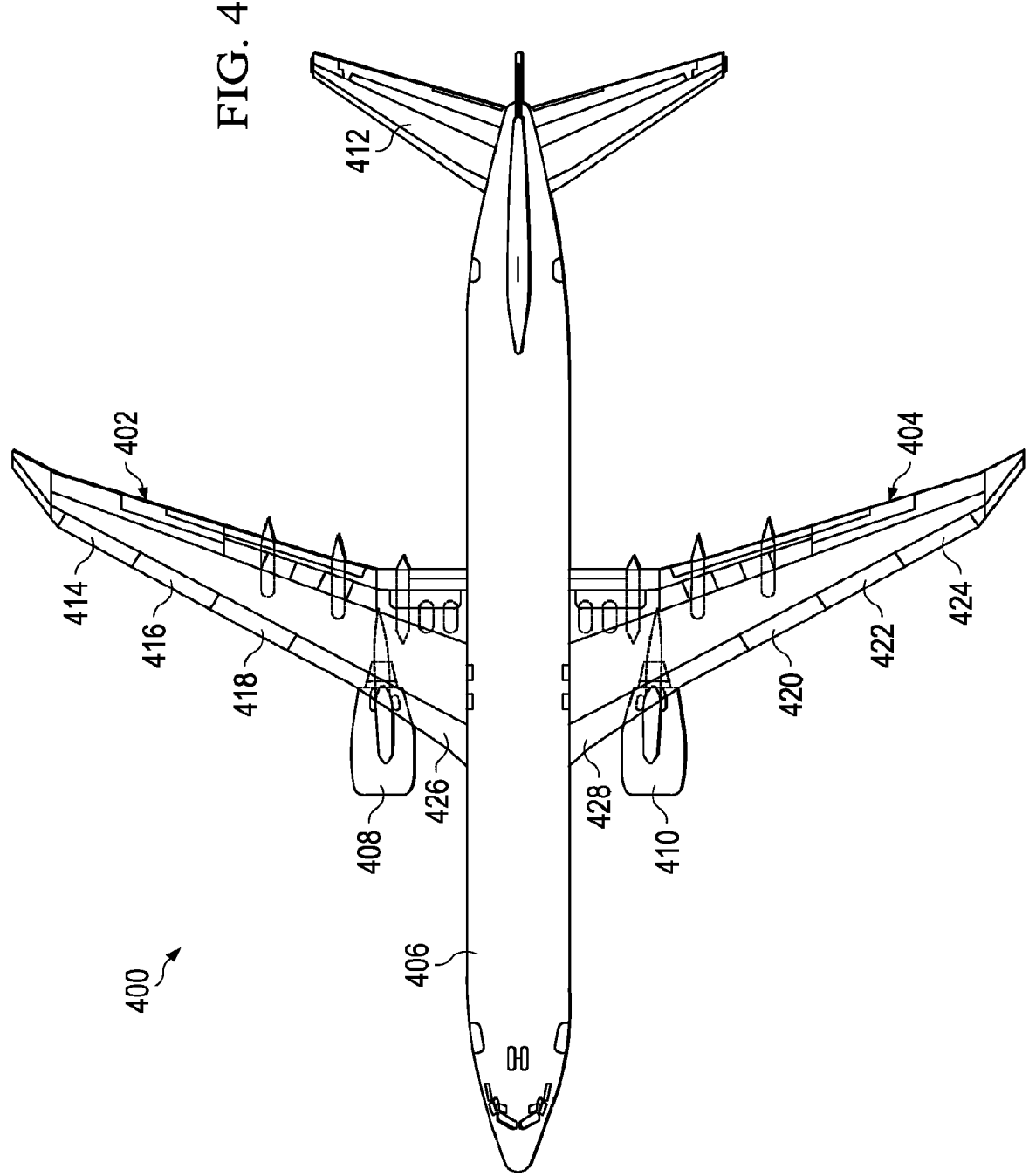
FIG. 4 is a diagram of an aircraft in which an advantageous embodiment may be implemented.

With reference now to FIG. 4, a diagram of an aircraft is depicted in which an advantageous embodiment may be implemented. Aircraft 400 is an example of an aircraft in which a surface control system may be implemented. In this illustrative example, aircraft 400 has wings 402 and 404 attached to body 406. Aircraft 400 includes wing mounted engine 408, wing mounted engine 410, and tail 412.

In these illustrative examples, surface control environment 300 in FIG. 3 may be implemented to provide surface control systems for wing 402 and wing 404. For example, slat systems 414, 416, 418, 420, 422, and 424 may be implemented on leading edges 426 and 428 of wings 402 and 404. These flight control systems may be implemented using flight control surface system 304 in FIG. 3. In some advantageous embodiments, all of the systems may be referred to collectively as a single flight control surface system.

Turning to FIGS. 5-8, diagrams illustrating a surface control system on the leading edge of a wing are depicted in accordance with an advantageous embodiment. These figures are presented to provide an illustration of a number of conceptual features for an implementation of surface control environment 300. In these illustrative examples, other mechanisms, such as tracks, an actuation system, rollers, and/or other components are not shown to more clearly illustrate some of the different features in flight control surface system 304 in FIG. 3.

Figure 5:
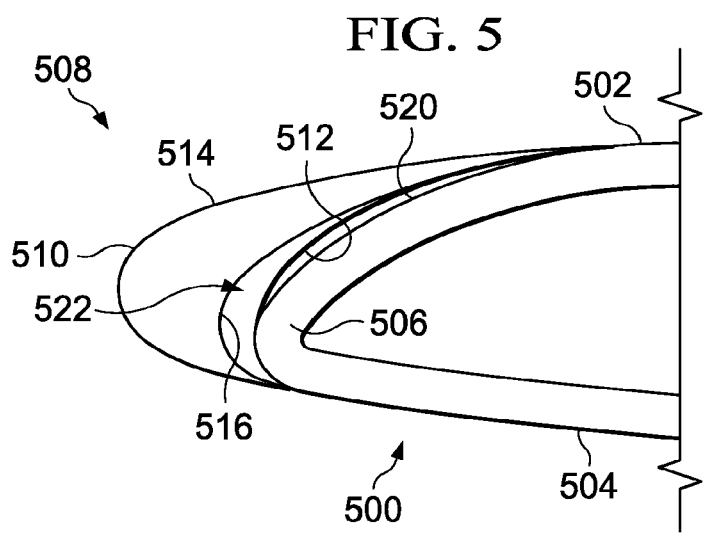
FIG. 5 is a diagram illustrating a portion of a wing with a flight control surface system in accordance with an advantageous embodiment.

With reference now to FIG. 5, a diagram illustrating a portion of a wing with a flight control surface system is depicted in accordance with an advantageous embodiment. In this example, a cross-sectional view of a portion of wing 500 is illustrated. Wing 500 is an example of a wing, such as wing 402 or wing 404 in FIG. 4.

In this illustrative example, wing 500 has top surface 502 and bottom surface 504. Leading edge 506 of wing 500 is shown in this partial view. Additionally, flight control surface system 508 also can be seen. Flight control surface system 508 includes leading edge device 510 and deformable fairing 512. Flight control surface system 508 is an example of one implementation for flight control surface system 304 in FIG. 3. For example, leading edge device 510 and deformable fairing 512 are examples of implementations for leading edge device 306 and deformable fairing 308 in FIG. 3.

In this depicted example, leading edge device 510 is shown in an undeployed position. Deformable fairing 512 is associated with leading edge device 510. In this illustration, deformable fairing 512 is shown in a deformed shape.

Leading edge device 510 has outer surface 514 and inner surface 516. As can be seen in this illustrative example, deformable fairing 512 covers at least a portion of inner surface 516. Depending on the particular implementation, deformable fairing 512 covers, but may not seal, the portion of inner surface 516. In some advantageous embodiments, a seal may actually be present. Inner surface 516 and deformable fairing 512 in its deformed shape are configured to substantially conform to leading edge surface 520 of leading edge 506 of wing 500.

In this example, space 522 may be present between deformable fairing 512 and inner surface 516 in the undeployed position. In other advantageous embodiments, space 522 may not be present when leading edge device 510 is in an undeployed position. In this example, leading edge device 510 may take the form of a slat. When in the undeployed position, the slat may be referred to as being in a stowed or cruise flight condition.

Figure 6:
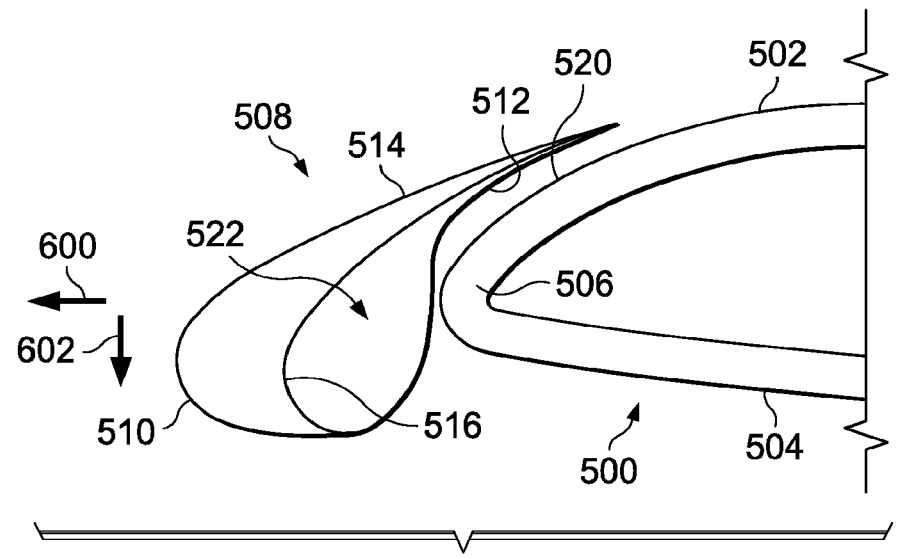
FIG. 6 is a diagram illustrating deployment of a leading edge device in accordance with an advantageous embodiment.

Turning now to FIG. 6, a diagram illustrating deployment of a leading edge device is depicted in accordance with an advantageous embodiment. In this illustrative example, leading edge device 510 is shown moving in the direction of arrow 600 and arrow 602. In other words, leading edge device 510 is being extended and lowered with respect to leading edge 506 of wing 500. As can be seen in this illustrative example, deformable fairing 512 changes shape from the deformed shape towards the original shape as leading edge device 510 with deformable fairing 512 moves away from leading edge 506.

Figure 7:
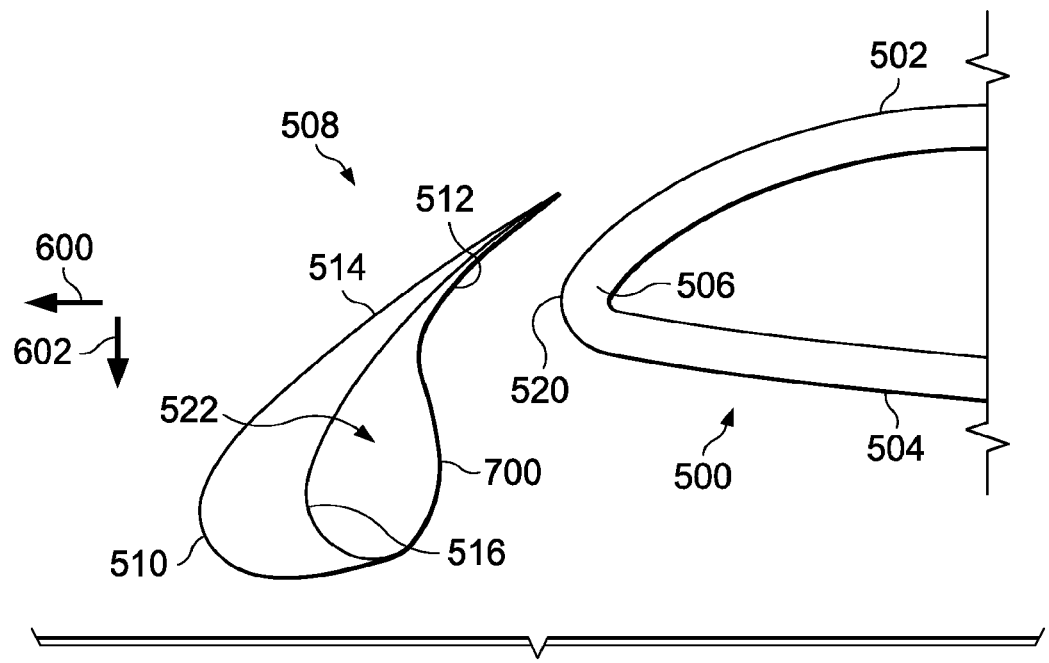
FIG. 7 is a diagram illustrating a flight control surface in a deployed position in accordance with an advantageous embodiment.

Turning now to FIG. 7, a diagram illustrating a flight control surface in a deployed position is depicted in accordance with an advantageous embodiment. In this illustrative example, leading edge device 510 has been fully extended and lowered with respect to leading edge 506 of wing 500. In this position, leading edge device 510 is in a deployed position.

As can be seen, deformable fairing 512 has substantially returned to the original shape. With this shape, airflow occurs over surface 700 of deformable fairing 512 instead of inner surface 516 of leading edge device 510. In this manner, undesired airflow over inner surface 516 may be reduced and/or avoided. With this change in airflow, the amount of noise generated by the deployment of leading edge device 510 also may be reduced.

The shape of deformable fairing 512 may vary, depending on the particular implementation. The shape of deformable fairing 512 is selected in the illustrative examples to reduce or eliminate undesired airflow over inner surface 516. This undesired airflow is the airflow that occurs when leading edge device 510 is in a position for an angle of attack having maximum lift in these illustrative examples.

The original shape for deformable fairing 512 may be any shape that may reduce and/or eliminate undesired airflow around leading edge device 510 when leading edge device 510 is deployed.

Figure 8:
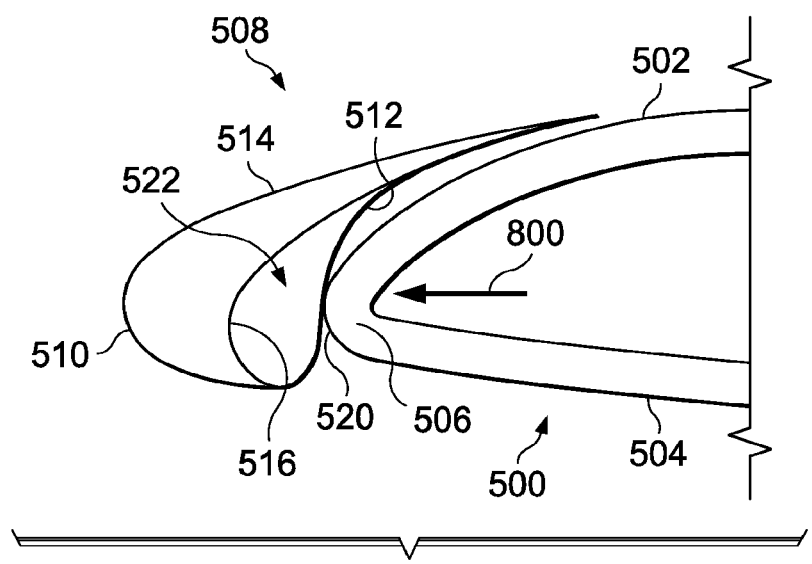
FIG. 8 is a diagram illustrating stowing of a flight control surface system in accordance with an advantageous embodiment.

Turning now to FIG. 8, a diagram illustrating stowing of a flight control surface system is depicted in accordance with an advantageous embodiment. In this example, leading edge device 510 is being moved back to the undeployed position. As can be seen in this illustrative example, deformable fairing 512 has force applied to deformable fairing 512 in the direction of arrow 800 by leading edge 506. Force 800 causes deformable fairing 512 to change shape from the original shape to a deformed shape. The deformed shape is configured to allow deformable fairing 512 and inner surface 516 of leading edge device 510 to move against leading edge surface 520 of leading edge 506 of wing 500.

Figure 9:
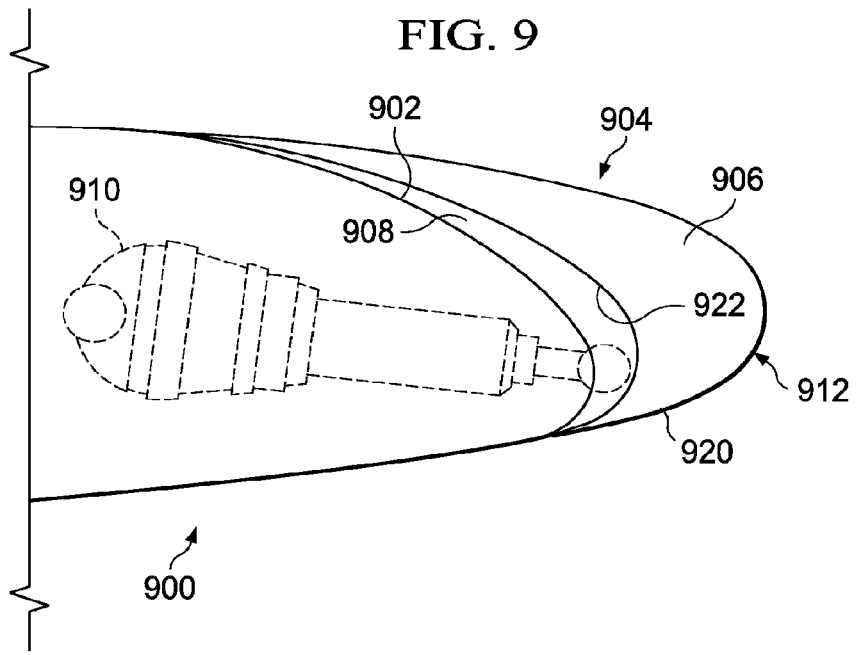
FIG. 9 is a diagram illustrating a flight control surface system associated with a wing in accordance with an advantageous embodiment.

Turning now to FIG. 9, a diagram illustrating a flight control surface system associated with a wing is depicted in accordance with an advantageous embodiment. In this illustrative example, a portion of wing 900 is depicted in accordance with an advantageous embodiment. Wing 900 is a cross-sectional view of a wing such as, for example, wing 402 or wing 404 in FIG. 4. In this example, leading edge 902 is shown for wing 900.

Flight control surface system 904 is shown in this example as being associated with wing 900. Flight control surface system 904 includes leading edge device 906, deformable fairing 908, and actuator system 910. As can be seen in this example, leading edge device 906 is shown in undeployed position 912.

In this example, leading edge device 906 has outer surface 920 and inner surface 922. Deformable fairing 908 covers at least a portion of inner surface 922. In this illustrative example, actuator system 910 may comprise a linear actuator.

Figure 10:
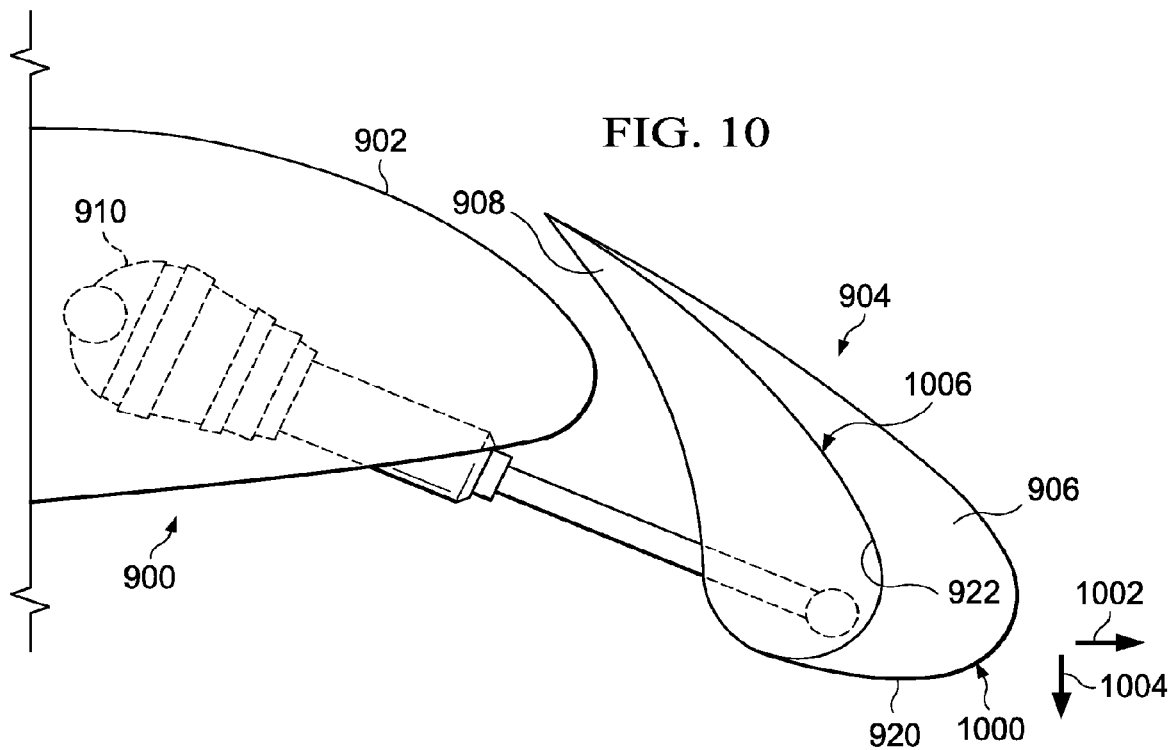
FIG. 10 is a diagram illustrating a leading edge device in a partially-deployed position in accordance with an advantageous embodiment.

Turning now to FIG. 10, a diagram illustrating a leading edge device in a partially-deployed position is depicted in accordance with an advantageous embodiment. In this example, leading edge device 906 is shown in partially-deployed position 1000. As can be seen, leading edge device 906 has been moved in the direction of arrow 1002 and arrow 1004 by actuator system 910.

In this view, deformable fairing 908 has been changed from the deformed shape to the original shape. This change in shape of deformable fairing 908 occurs in this example because the mechanical force against deformable fairing 908 provided by leading edge 902 of wing 900 is no longer present. Space 1006 is present between deformable fairing 908 and inner surface 922 of leading edge device 906. Actuator system 910 may extend through deformable fairing 908. In other words, a hole or other opening may be present in deformable fairing 908 to allow for a portion of actuator system 910 to be connected or otherwise associated with leading edge device 906. A gasket or other seal may be employed around the opening to reduce undesired airflow.

In these examples, deformable fairing 908 is configured to return to the original shape through the use of materials such as, for example, without limitation, aluminum, titanium, steel, a plastic, a polyurethane, a synthetic composite, a metal, a metal ally, and/or a shape memory alloy. The shape memory alloy may be, for example, without limitation, nitinol, a nickel-titanium alloy, or some other suitable material. As can be seen, deformable fairing 908 has a shape that may reduce and/or eliminate undesired airflow around inner surface 922. Deformable fairing 908 is designed to reduce an undesired noise that may be caused by the movement of air over leading edge device 906 in partially-deployed position 1000.

Figure 11:
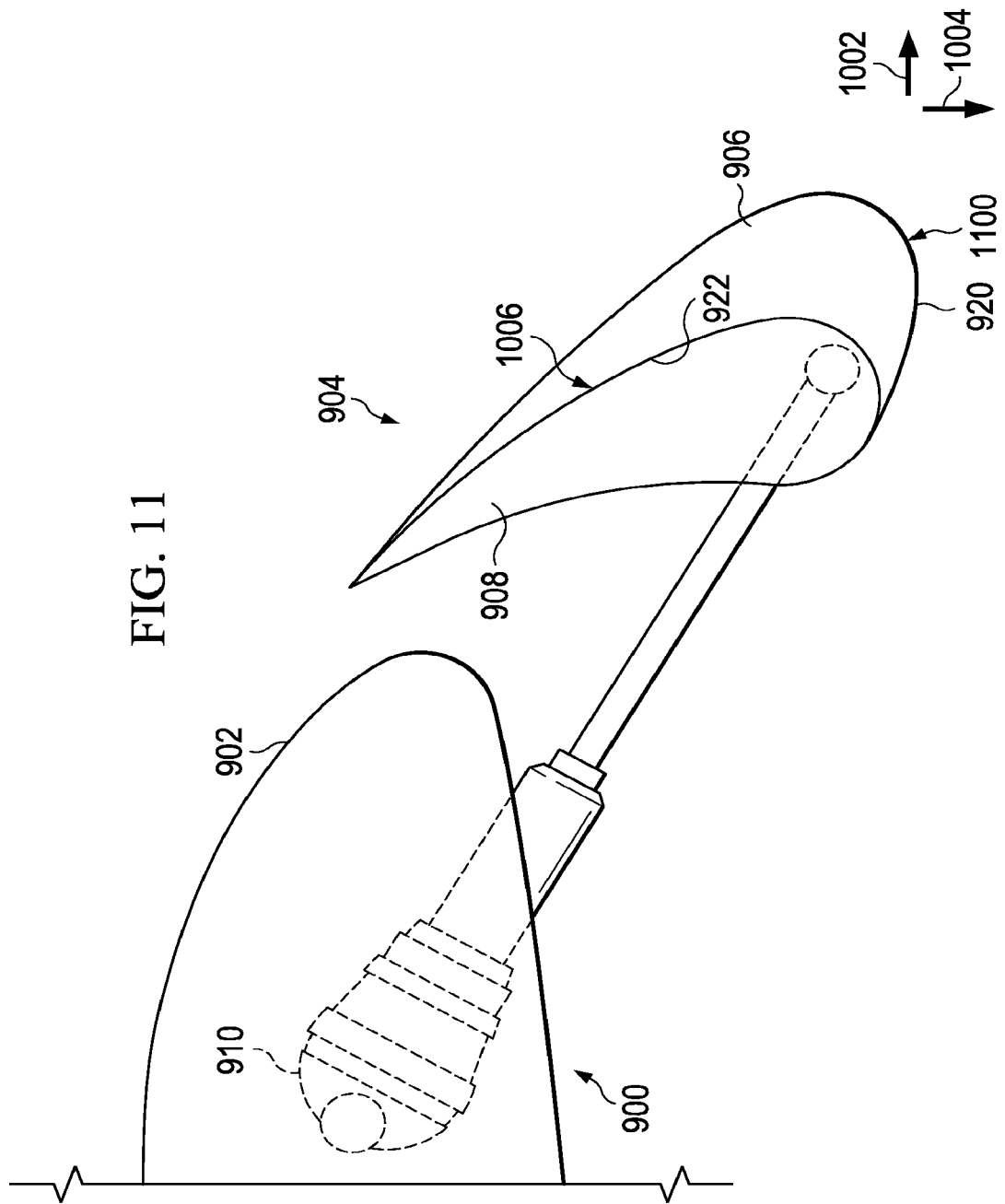
FIG. 11 is a diagram illustrating a fully-deployed leading edge device in accordance with an advantageous embodiment.

Turning now to FIG. 11, a diagram illustrating a fully-deployed leading edge device is depicted in accordance with an advantageous embodiment. In this example, leading edge device 906 is now in deployed position 1100. In this position, the airflow around leading edge device 906 and deformable fairing 908 may be such that wing 900 provides increased lift. Additionally, a reduction in noise also occurs as compared to currently used slats for leading edge devices.

The illustrations of the flight control surface systems in FIGS. 5-11 have been provided only as examples of flight surface control systems in some advantageous embodiments. In other advantageous embodiments, the flight control surface systems may have different shapes and/or configurations. For example, in some advantageous embodiments, a slide system may be used in addition to the linear actuator used in actuator system 910.

Figure 12:
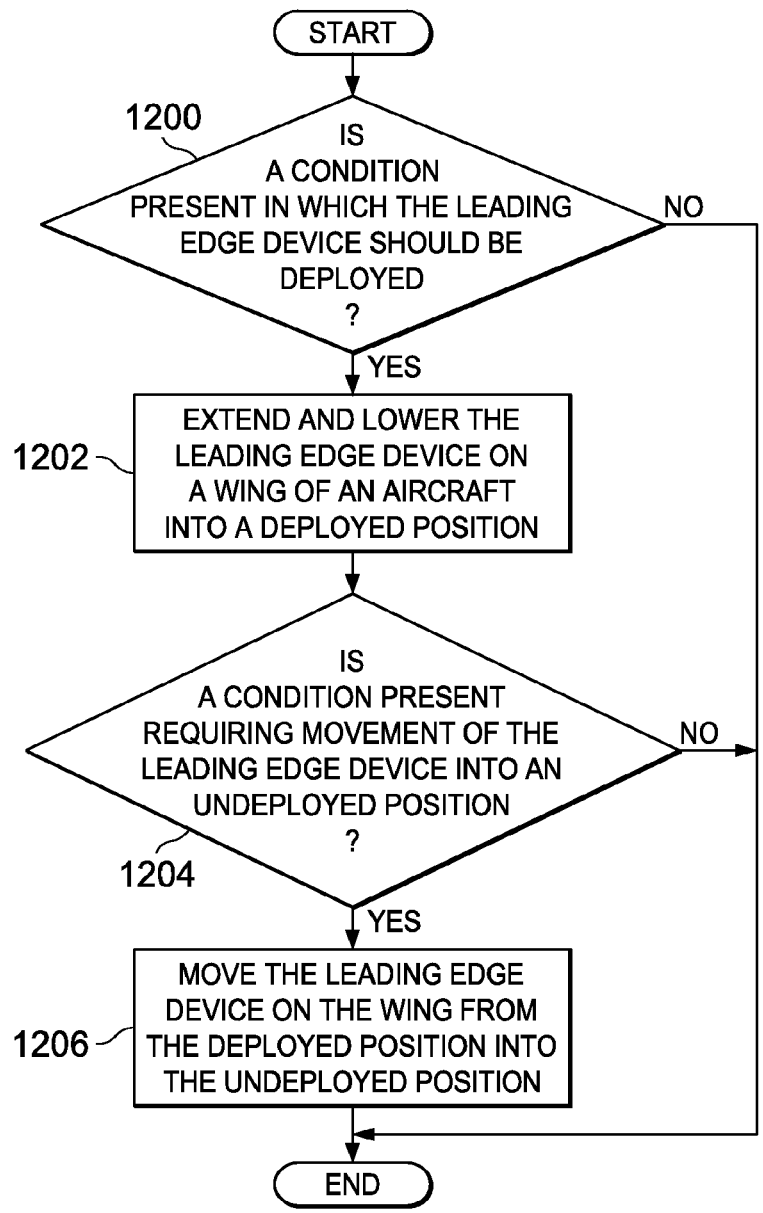
FIG. 12 is a flowchart of a process for managing a flight control surface system in accordance with an advantageous embodiment.

Turning now to FIG. 12, a flowchart of a process for managing a flight control surface system is depicted in accordance with an advantageous embodiment. The process illustrated in FIG. 12 may be implemented in surface control environment 300 in FIG. 3 using flight control surface system 304 in FIG. 3.

The process begins by determining whether a condition is present in which the leading edge device should be deployed (operation 1200). This condition may be, for example, preparation for a takeoff or a landing of an aircraft. If the condition is not present, the process terminates. If the condition is present that requires deployment of the leading edge device, the process extends and lowers the leading edge device on a wing of an aircraft into a deployed position (operation 1202).

In operation 1202, a deformable fairing covers the inner surface of the leading edge device. The deformable fairing changes from a deformed shape to an original shape as the leading edge device is moved into the deployed position. In these illustrative examples, the movement of the leading edge device is an extension and lowering of the leading edge device with respect to the leading edge of the wing. Of course, in some advantageous embodiments, the leading edge device may only be extended without lowering the leading edge device.

A determination is then made as to whether a condition is present requiring movement of the leading edge device into an undeployed position (operation 1204). If a condition requiring movement of the leading edge device into an undeployed position is present, the leading edge device on the wing is moved from the deployed position into the undeployed position (operation 1206). This movement of the leading edge device causes the deformable fairing to change to the deformed shape. This change in shape may occur as the deformable fairing encounters force that may be caused by the leading edge of the wing.

With reference again to operation 1204, if a condition is not present requiring movement of the leading edge device from the deployed position to the undeployed position, the process terminates.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for a flight control surface system. In one or more of the different advantageous embodiments, an apparatus comprises a leading edge device and a deformable fairing. The leading edge device has an outer surface and an inner surface. The deformable fairing is attached to the leading edge device such that the deformable fairing covers at least a portion of the inner surface.

The deformable fairing has an original shape when the leading edge device is in a deployed position and a deformed shape when the leading edge device is in an undeployed position. Using one or more of the different advantageous embodiments, airflow around the leading edge device may be changed in a manner that reduces noise. For example, the vertical or swirling airflow that occurs on the inner surface or cove of the leading edge device, such as a slat, may be reduced or changed in a manner that reduces noise that may occur.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to aircraft, the different advantageous embodiments may be applied to other types of platforms. For example, without limitation, other advantageous embodiments may be applied to a submarine, a personnel carrier, a spacecraft, a surface ship, and/or some other suitable object.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling lift using a flight control surface system, the method comprising:
    moving a leading edge device on a wing from an undeployed position to a deployed position, the leading edge device comprising an outer surface, an inner surface, and a deformable fairing attached to the leading edge device the deformable fairing covers at least a portion of the inner surface;
    changing the deformable fairing from a deformed shape, conforming to a leading edge surface of the wing, to an original shape reducing a noise level produced from air flowing over the leading edge device, via moving the leading edge device to the deployed position and the deformable fairing comprising a yield strain level adequate for autonomously returning the deformable fairing to the original shape; and
    moving the leading edge device from the deployed position to the undeployed position, wherein the deformable fairing changes from the original shape to the deformed shape.

2. The method of claim 1, wherein the leading edge device is moved using an actuator system.

3. The method of claim 2, wherein the actuator system comprises a number of actuators and a slide system.

4. The method of claim 1, wherein the deformable fairing changes from the original shape to the deformed shape when the deformable fairing is pushed against the leading edge surface of a wing when moving into the undeployed position.

5. The method of claim 4, wherein the deformable fairing is comprised of a layer of a shape memory alloy and a coating configured to reduce wear on at least one of the deformable fairing and the leading edge surface.

6. The method of claim 1, wherein the deformable fairing with the original shape reduces noise caused by air flowing over the leading edge device in the deployed position.

7. The method of claim 1, further comprising changing, via the leading edge device, an airflow that increases lift of an aircraft when the leading edge device is in the deployed position as compared to the undeployed position.

8. The method of claim 1, wherein a space is present between the deformable fairing and the inner surface when the leading edge device is in the deployed position.

9. A method for reducing a noise level produced by an aircraft, the method comprising:
    preparing a wing of the aircraft for a phase of flight by extending, via an actuator, a leading edge device of the wing;
    locating a fairing on an inner surface of the leading edge device;
    deploying the fairing into an original shape reducing undesirable airflow over the leading edge device, via the leading edge device moving to a deployed position and the fairing comprising a yield strain level adequate to autonomously return the fairing to the original shape from a deformed shape, conforming to a leading edge surface of the wing;
    retracting, via the actuator, the leading edge device; and
    deforming, via overcoming the yield strain level of the fairing via contacting the leading edge surface, the fairing into the deformed shape.

10. The method of claim 9, further comprising the leading edge device being a slat.

11. The method of claim 10, further comprising the phase of flight being a takeoff phase.

12. The method of claim 10, further comprising the phase of flight being a landing phase.

13. The method of claim 9, further comprising:
    the leading edge device comprising an outer surface and the inner surface, the outer surface being farther from, and the inner surface being nearer to, a structure connected to the actuator;
    deploying the leading edge device, via the actuator, away from the structure;
    removing a mechanical load from the fairing with the leading edge device being in the deployed position; and
    covering, via the fairing in the original shape, at least a portion of the inner surface.

14. The method of claim 9, further comprising the structure being the wing, wherein the leading edge device is moveably attached to the wing.

15. The method of claim 9, further comprising changing the fairing from the original shape to the deformed shape by pushing the fairing against the leading edge device when retracting the leading edge device to an undeployed position.

16. The method of claim 9, wherein the fairing comprises of a layer of a shape memory alloy and a coating configured to reduce wear on at least one of: the fairing, and the leading edge device.

17. The method of claim 13, further comprising:
    retaining a space between the fairing and the inner surface when the leading edge device is in the deployed position; and
    moving the leading edge device, via an actuator system, between the deployed position and an undeployed position, and removing the mechanical load from the deformable fairing as the actuator system moves the leading edge device from the undeployed position to the deployed position.

18. A method for reducing noise produced by an existing wing via refurbishing an existing flight control surface system on the existing wing: the method comprising:
- removing the flight control surface system off the existing wing;
- retaining an existing actuator system for an existing leading edge device on the existing wing; and
- attaching a new leading edge device comprising a flexible panel attached to the leading edge device, the flexible panel comprising a yield strain level adequate for autonomously returning the flexible panel to an original shape, reducing a noise level produced from air flowing over the new leading edge device, from a deformed shape, conforming to a leading edge surface of the wing responsive to the leading edge device being in an undeployed position, and covering at least a portion of an inner surface of the leading edge device.

19. The method of claim 18, further comprising changing the flexible panel from the original shape to the deformed shape by pushing the flexible panel against the new leading edge device when retracting the new leading edge device to an undeployed position, wherein the original shape comprises a solid form.

20. The method claim 18 wherein the flexible panel comprises a material selected from one of: a shape memory alloy, a nickel-titanium alloy, nitinol, aluminum, titanium, steel, a plastic, a synthetic composite, a polyurethane, a metal, and a metal alloy.

* * * * *